US007440997B2

United States Patent
Colling et al.

(10) Patent No.: US 7,440,997 B2
(45) Date of Patent: Oct. 21, 2008

(54) MECHANISM FOR SUPPORTING BROWSER NAVIGATION WHILE PRESERVING IMPORTANT APPLICATION RETURN STATES

(75) Inventors: Aaron M. Colling, Seattle, WA (US); Dan E. Walther, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 840 days.

(21) Appl. No.: 10/460,907

(22) Filed: Jun. 13, 2003

(65) Prior Publication Data

US 2004/0254979 A1     Dec. 16, 2004

(51) Int. Cl.
  G06F 15/16  (2006.01)
(52) U.S. Cl. ........................ 709/203; 709/204
(58) Field of Classification Search ............... 709/203, 709/204
  See application file for complete search history.

(56) References Cited

U.S. PATENT DOCUMENTS 7,089,563 B2 *  8/2006  Nagel et al. ............... 719/313
2002/0194211 A1 * 12/2002 Subramanian et al. ...... 707/500
2005/0240863 A1 * 10/2005 Olander et al. ............ 715/513

* cited by examiner

Primary Examiner—John Follansbee
Assistant Examiner—Glenford Madamba
(74) Attorney, Agent, or Firm—Workman Nydegger

(57) ABSTRACT

A mechanism that supports navigation in a manner that state information for certain web pages will be preserved through the completion of a task. While at that original return web page, the host computing system receives a request to perform a task in which the browser is to navigate to other web pages as part of completing the task. As the host computing system navigates the browser to each of these web pages, the host computing system stores the application state for each of the subsequent task-oriented web pages, along with a copy of the application state of the return web page. Once the task is complete, the host computing system uses the copy of the application state, rather than the original of the application state, to return the browser to the return web page.

14 Claims, 4 Drawing Sheets

MECHANISM FOR SUPPORTING BROWSER NAVIGATION WHILE PRESERVING IMPORTANT APPLICATION RETURN STATES

BACKGROUND OF THE INVENTION

1. The Field of the Invention

The present invention relates to browser navigation technology. More specifically, the present invention relates to mechanisms for preserving application state used to dynamically create web pages in a way that allows a previously viewed web page to be recreated correctly if forward navigation brings the user back to that web page, while still supporting backward navigation.

2. Background and Related Art

Computing and networking technology has transformed the way we work and play. Networks have become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating data over a network.

A browser, when implemented on a network-enabled computing system, is capable of navigating through web pages. The browser displays each web page to the user and, depending on the web page, may allow the user to enter information into the web page, or select a hyperlink in the web page to cause the browser to navigate to another web page. The user may also typically use the browser to directly enter a web site address to go directly to the web page without selecting a hyperlink.

Typically, there is state information (hereinafter also referred to as "application state") that is maintained by the host computing system that hosts a web page in order to support the proper interface of the web page with the user. For example, suppose that the web page allows the user to compose an e-mail message. The information that the user enters into various fields of the e-mail composition form may be part of the application state that is stored by the host computing system.

Most browsers have the ability to backwards navigate. In other words, the browser caches pages viewed by the user and, by selecting a back button on the browser, can return the user to the immediately prior web page that was displayed to the user, without necessarily contacting the server. Sometimes, a host computing system may only store application state for a current web page navigated to by the browser. Accordingly, when the user presses the back button, the browser presents the previously displayed web page using locally cached application state. If the user then selects a link on that prior web page, a browser will transmit a request to the host computing system based on that prior web page. The server may not be able to correctly service this request since the application state for the prior web page may no be longer available, and thus the data being acting upon may be in an incorrect state for the requested action.

In order to improve the user experience when returning to a web page that was previously navigated to (either through backward navigation or perhaps even by forward navigating to the same web page), the host computing system often preserves application state for a limited number of most recently navigated web pages. Accordingly, when the user backward navigates to a recent web page or navigates forward returning to a web page that was recently navigated to, the saved application state information is used to supplement the rendering of that web page.

The number of prior web pages for which the host computing system saves application state for a given browser will be limited even if the host computing system has robust memory resources because the host computing system may often serve an enormous number of browsers, any one of which being capable of navigating to enormous numbers of web pages. Accordingly, the memory in which the application state is placed is subject to recycling rules in which the application state will be discarded at some point.

This queuing mechanism works well except if the browser is to return to a web page that has application state that has been eliminated due to the recycling rules. There are cases in which a browser will predictably go back to a particular web page after having performed a task that requires navigation to a number of other web pages.

For example, suppose that a browser has browsed to a web page that includes the user's e-mail inbox. Now suppose the user selects a button indicating that the user is to compose an e-mail. Typically, in a laptop or desktop computer that has sophisticated and spacious display capability, the e-mail composition form may be displayed in a single view. However, there are many computing systems with browsers that have far more limited display capabilities. For example, a mobile telephone or PDA with browser capability may typically display much less information. Due to this limited capability, an e-mail composition form may be displayed in multiple views, one being displayed after the other. Accordingly, composition of the e-mail may involve navigation to a number of web pages before returning to the original in-box web page. If the recycling rules were to cause the host computing system to drop the application state for the in-box web page prior to returning to the in-box web page, then the rendering of the in-box would be affected thereby degrading performance.

Accordingly, what would be advantageous is a way of preserving application state for web pages that are to be returned to once a task is completed even if the host computing system limits the number of prior web pages for which it preserves application state for a given browser. It would further be advantageous if the application state was stored in such a way that allows the user to navigate back to prior web pages without breaking the web site's functionality.

BRIEF SUMMARY OF THE INVENTION

The foregoing problems with the prior state of the art are overcome by the principles of the present invention which are directed towards a mechanism that supports navigation in a manner that application state for certain web pages will be preserved through the completion of a task that, when completed, will result in the return to the web page. The mechanism is implemented in a host computing system that provides various web pages for a browsing computing system over a network. As the browsing computing system navigates to a web page provided by the host computing system, the host computing system constructs application state for that web page that is specific to the browsing computing system. The host computing system places application state in a memory portion that is subject to recycling rules that require application state be stored for only a limited number of web pages that the browsing computing system had most recently navigated to. The host computing system maintains the application state in a manner that certain web pages may be returned to once a task is complete even if the original application state for that web page has been discarded before the task is complete due to the limited size of the application state queue.

Upon receiving a request to perform a task, the host computing system sets aside (in a second memory portion that is not subject to the recycling rules) application state for the page containing the link that initiates the task (hereinafter also referred to as a "return web page"). This is the page that will need to be rendered once the task is complete. As the host computing system navigates the browser to each of these web pages, the host computing system stores the application state for each of the subsequent task-oriented web pages, along with a copy of the application state of the return web page, or a reference to a copy of the application state of the return web page. Once the task is complete, the host computing system uses the copy of the application state, rather than the original of the application state, to return the browser to the return web page. Accordingly, even if the original copy of the application state of the return web page is deleted or lost, the copy stored as part of the state of the subsequent web pages is still available to return to the return web page. Since the state information for the return web page is preserved, the user experience is greatly enhanced since correct generation of the return web page is assured.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
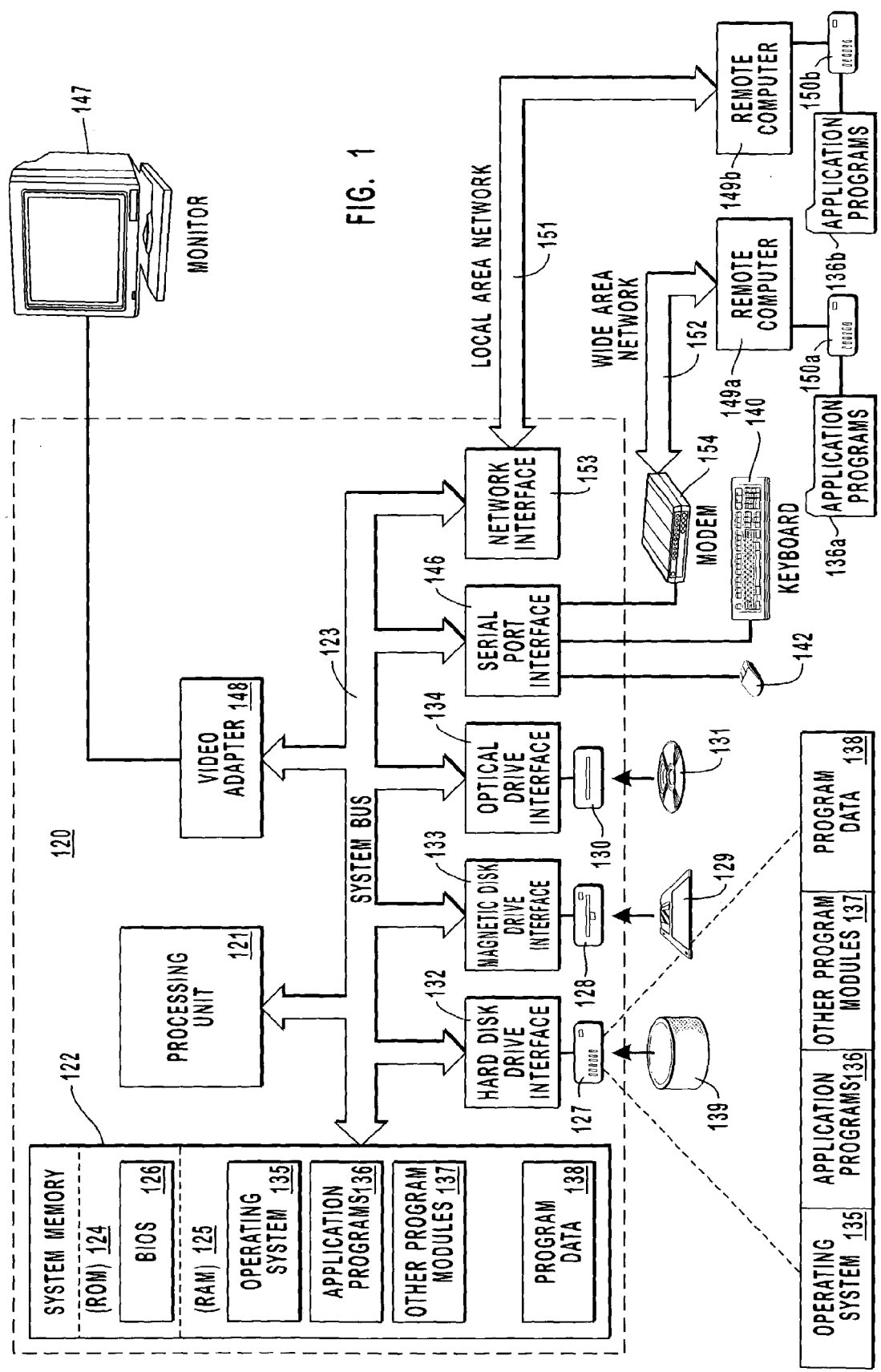
FIG. 1 illustrates a suitable computing system that may implement that features of the present invention.

The principles of the present invention relate to mechanisms that support navigation in a manner that application state for certain web pages will be preserved through the completion of a task. While at that original return web page, the host computing system receives a request to perform a task in which the browser is to navigate to other web pages as part of completing the task. As the host computing system navigates the browser to each of these web pages, the host computing system places the application state for each of the subsequent task-oriented web pages in a first memory portion that is subject to recycling rules, while having a copy of the application state of the return web page stored in a second memory portion that is not subject to the recycling rules. Once the task is complete, the host computing system uses the copy of the application state for the return web page, rather than the original of the application state, to return the browser to the return web page. Accordingly, even if the original copy of the application state of the return web page is deleted or lost due to recycling rules, the state information for the return web page is preserved, thereby enhancing the user experience.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code. Although not required, the invention will be described in the general context of computer-executable instructions, such as program modules, being executed by computers in network environments. Generally, program modules include routines, programs, objects, components, data structures, etc. that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates suitable computing environment in which the principles of the present invention may be employed in the form of a computer 120. The computer 120 includes a processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 represents a computing system that may implement the principles of the present invention, the principles of the present invention may be employed in any computing system that is capable of browsing to network sites. The computing system illustrated in FIG. 1 is illustrative only, and by no means represents even a small portion of the wide variety of environments in which the principles of the present invention may be implemented. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
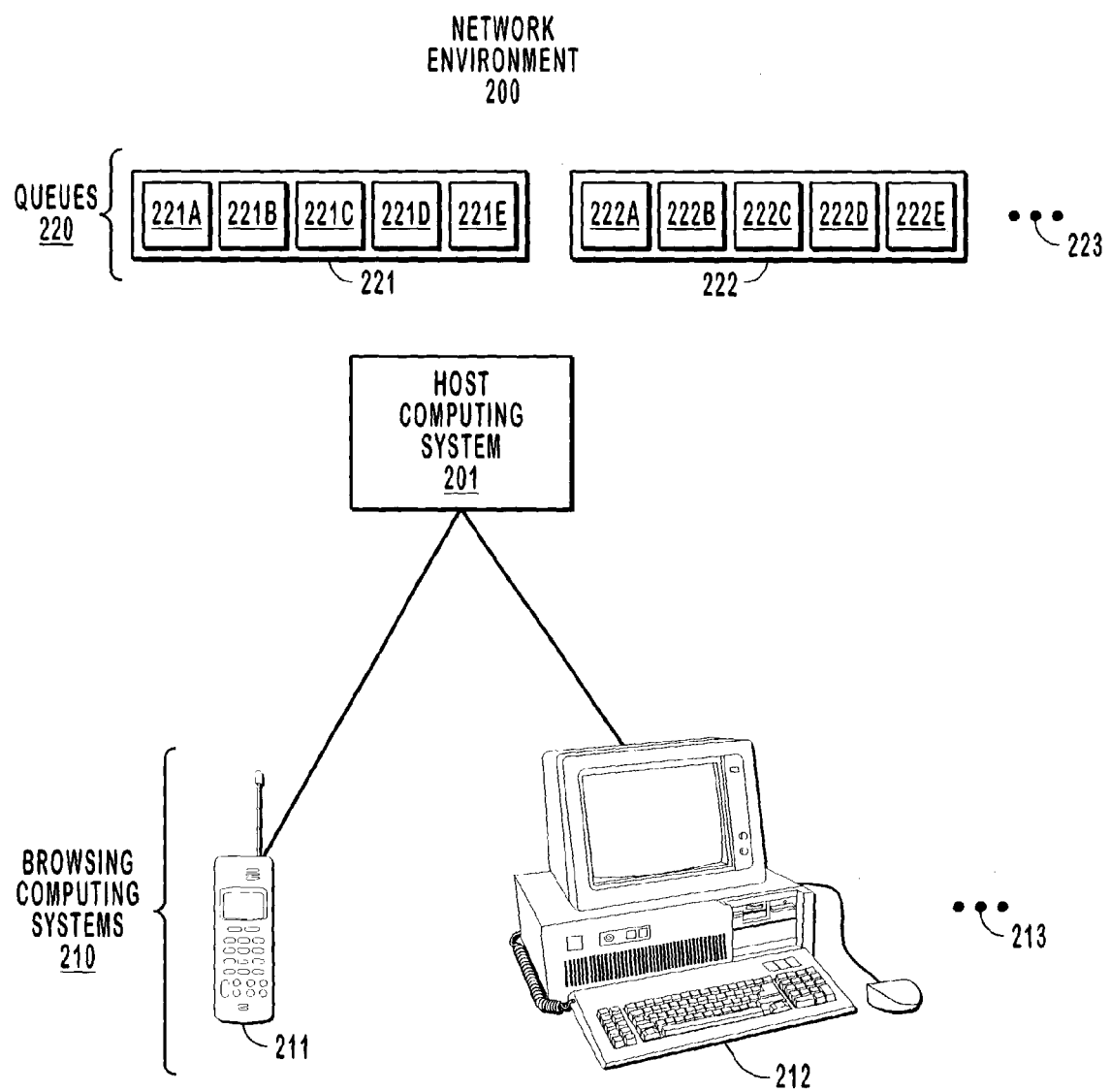
FIG. 2 illustrate suitable network environment in which the principles of the present invention may be employed.

FIG. 2 illustrates a network environment 200 in which the principles of the present invention may be employed. The network environment 200 includes a host computing systems 201 that hosts a number of web pages, and a number of browsing computing systems 210. The browsing computing system may take a wide variety of forms although browsing computing system 211 is illustrated as a mobile telephone, and browsing computing system 212 is illustrated a desktop computer. The desktop computer may be structured as described above for the computer 120, although the mobile telephone may also have general processing capability such as is described for the computer 120. The network environment 200 may also include other browsing computing systems as represented by the horizontal ellipses 213. Each of the browsing computing system includes a browser that presents web pages to the user.

The host computing system maintains a number of queues 220. Each queue includes application state for a specific browsing computing system. For example, queue 221 holds application state for browsing computing system 211, and queue 222 holds application state information for browsing computing 212. Other queues may also be maintained for other browsing computing systems as represented by the horizontal ellipses 223.

The queues may be instantiated in a first memory portion that is subject to recycling rules that cause the application state to be recycled at some point. For example, the recycling rules may cause each queue to store application state for only a limited number of web pages that the corresponding browsing computing system navigated to. For example, queue 221 includes application states 221A through 221E that may be used to create the corresponding five most recent web pages navigated to by the browsing computing system 211. Queue 222 includes application states 222A through 222E that may be used to create the corresponding five most recent web pages navigated to by the browsing computing system 212. The application state includes not only information specific to the web page, but is also specific to the corresponding browsing computing system and enables the browser to create the web page in a manner that is appropriate for that browsing computing system. Although the queue is illustrated as holding application state for five web pages, the queue may be limited to application state for fewer than five, one, or more than five web pages.

When a browsing computing system navigates to a web page provided by the host computing system, the host computing system 201 constructs application state for that web page and that is specific to the browsing computing system. If the queue was already full, then the application state for the least recently navigated web page is discarded to limit memory usage on the host computing system 201 in accordance with the recycling rules. Although the host computing system 201 may have robust memory capability, there still will often be some limit in the number of web pages for which application state will be maintained due to the high number of browsing computing systems that are served by the host computing system 201 (particular in an Internet environment), and since each browser may navigate to a large number of web pages.

Figure 3:
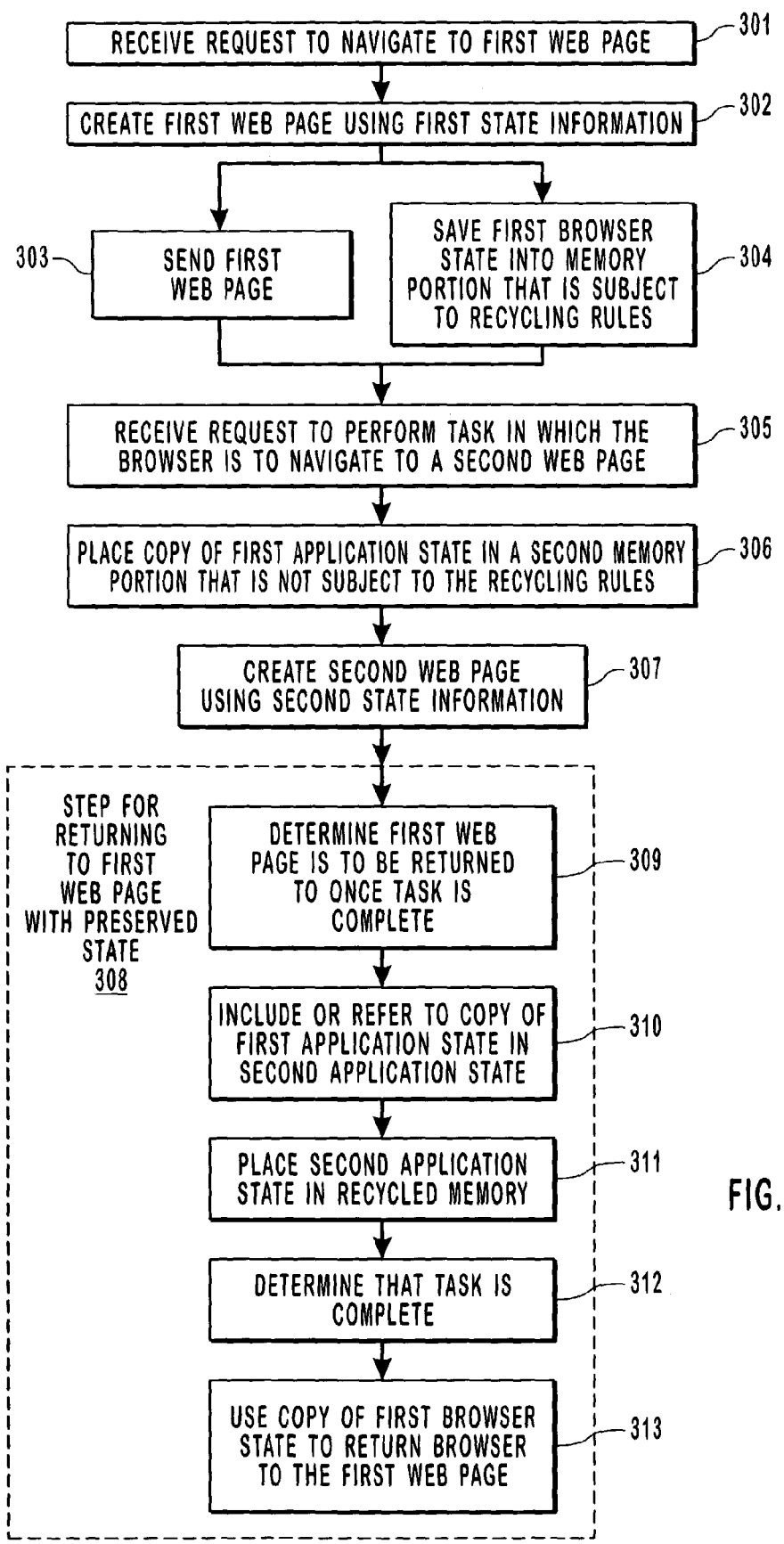
FIG. 3 illustrates a flowchart of a method for supporting navigation in a manner that preserves state information for return web pages in accordance with the principles of the present invention.

FIG. 3 illustrates a flowchart of a method 300 for the host computing system maintaining the application state in a manner that certain web pages may be returned to once a task is complete even if the original application state for that web page has been discarded before the task is complete. As the method 300 may be implemented in the context of the network environment 200, the method 300 will be described with frequent reference to FIG. 2 as well as FIG. 3.

The host computing system 201 receives a request from the browser of a browsing computing system to navigate to a first web page (act 301). The first web page is not necessarily the first web page that the browsing computing system navigated to during a particular browser session. The term "first" is merely used to distinguish that web page from other web pages that are mentioned herein. The terms "first", "second", and "third" are not used to imply any sequential ordering per se.

In response to the request, the host computing system creates the first web page using first application state that is specific to the first web page and the browser (act 302). The state information allows the first web page to be created with any customizations appropriate for the first web page and the browser. The state information may include state information originally included in a web page downloaded to the browser as well as other information provided by the user after downloading the original version of the web page. The host computing system then also sends the web page created using the first application state to the browsing computing system (act 303). The host computing system also places the first application state in a first memory portion (i.e., the queue) that is subject to the recycling rules in response to having received the first request (act 304).

The host computing system then receives a request from the browser to perform a task that involves sequential navigation to a number of web pages prior to being returned to the first web page (act 305). Since the first web page is to be returned to after the task is completed, the first web page will also be referred to herein as a "return web page". Several example scenarios in which a return web page is to be returned to after having completed a task will be described in further detail with respect to FIGS. 4 and 5. For example, the request may take the form of an indication that the user has selected a hyperlink in the first web page that initiates the task.

As previously mentioned, in order to complete the task prior to returning to the return web page, the host computing system navigates the browser to a number of web pages including a web page that will be identified herein as a "second" web page. In other words, the host computing system creates each web page using state information specific to the corresponding web page and the browser (act 306). If the second web page is the initial task-oriented web page to be used to accomplish the task, then the host navigates the browser to the initial task-oriented web page directly from the first web page. If the second web page is not the initial task-oriented web page to be used to accomplish the task, that the host computing system navigates the browser to the second web page indirectly via one or more intermediary task-oriented web pages that were also used to progress through the task. The host computing system receives a request from the browser to navigate to the second web page (act 305) and then places a copy of the first application state in a second memory portion that is not subject to the recycling rules (act 306). The host computing system then creates the second web page using second application state that is specific to the second web page and the browser (act 307). A similar request and response will occur for the other web pages that are presented in sequence in order to accomplish the task.

The method then includes a functional, result-oriented step for returning to the return web page once the task is complete with preserved state without requiring the original of the application state (step 308). This result-oriented step may include any corresponding acts for accomplishing this result. However, in the illustrated embodiment, the step 308 includes corresponding acts 309, 310, 311, 312 and 313.

Specifically, the host computing system determines that the browser should be returned to the return web page when the task is complete (act 309). Assuming that the host computing system determines that the browser is to return to the first web page after completion of the task, the host computing system causes the second application state to include or refer to a copy of the first application state (act 310), and then places the second application state in the first memory portion (i.e., the queue) (act 311). Recall that the first memory portion is subject to the recycling rules. Upon determining that the task is complete (act 312), the host computing system uses the copy of the first application state, rather than the original of the first application state, to recreate the first web page upon completion of the task (act 313).

Having now described the principles of the present invention, the mechanism will be further clarified and the utility of the invention further explored using a couple of example scenarios. One of the scenarios is explained with reference to FIG. 4, and the other scenario is explained with reference to FIG. 5.

Figure 4:
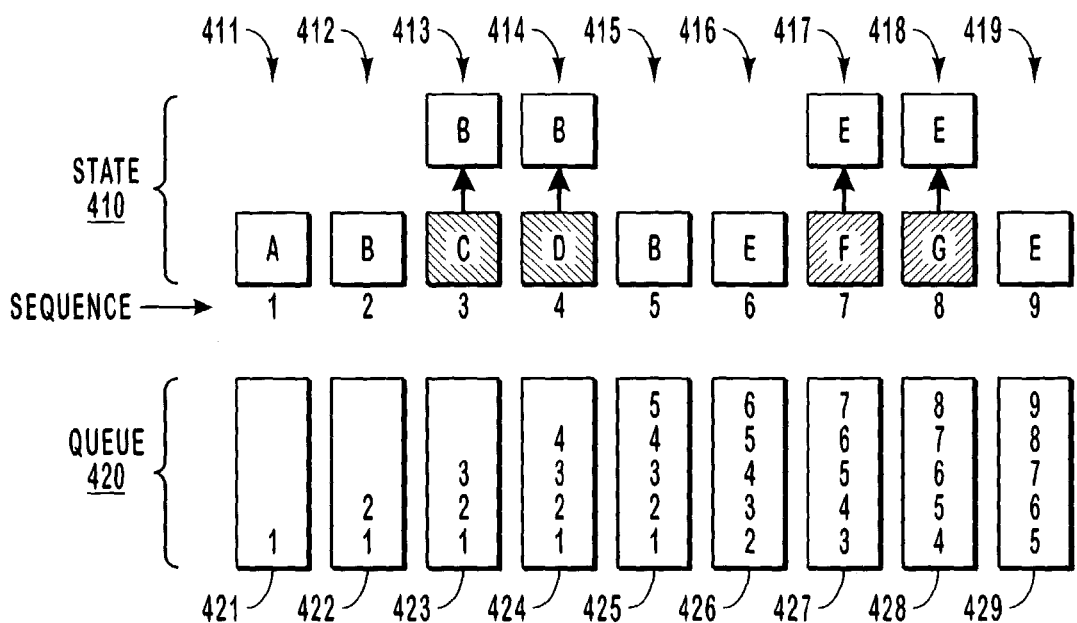
FIG. 4 illustrates a first scenario in which the principle of the present invention are employed to implement one-tier of task return navigation.

FIG. 4 illustrates a scenario in which there is one-tier of task return implemented. The scenario includes a browser going to a home page, opening an e-mail in-box, searching a contact, returning to the e-mail in-box, opening an e-mail, replying to an e-mail, canceling the reply and then returning to the open e-mail. In this case, it is important for proper operation to return to the in-box page once the contact search task is complete, and to return to the open e-mail once the reply to the e-mail is cancelled. Accordingly, the e-mail in-box web page, and the open e-mail web page may be considered return web pages in the context of tasks that are invoked from those web pages.

Referring to FIG. 4, the scenario involves 9 separate sequential navigations. The application state 410 corresponding to each navigation sequence 1 through 9 is illustrated as 411 through 419, respectively. The queue 420 corresponding to each navigation sequence 1 through 9 is illustrated as 421 through 429, respectively. The queue is capable of holding state for the five most recently navigated web pages in accordance with recycling rules. The scenario will work even if the queue is only capable of storing state information for the most recent web page. However, a larger queue size enables backward navigation.

At the first navigation sequence, the browser navigates to a main menu. The application state for this navigation sequence is illustrated as state 411 and as A. The queue 421 includes only the state information for the first navigation sequence.

At the second navigation sequence, the user selects an in-box option and is navigated to an in-box web page. The application state for this navigation sequence is illustrated as state 412 and as B. The queue 422 includes the state for both the first and second navigation sequences.

At the third navigation sequence, the user elects to search for a contact and is navigated to a first contact search web page. The application state for this third navigation sequence is illustrates as state 413. The application state for the first contact search page is represented as state C. In this case, since the in-box web page is to be returned to after the contact search is complete, the application state 413 includes or refers to the application state B for the in-box web page. The queue 423 includes the state for the first through third navigation sequences.

At the fourth navigation sequence, the user clicks next in the first contact web page to navigate the browser to a second contact search web page. The application state for this navigation sequence is illustrates as state 414. The application state for the second contact search page is represented as state D. Since the in-box web page is to be returned to after the contact search is complete, the application state 414 also includes or refers to a copy of the application state B for the in-box web page. The queue 424 includes the state for the first through fourth navigation sequences.

This process may continue in a similar fashion preserving the application state for the return web page regardless of the number of sequential contact search pages needed. Accordingly, devices that have limited display capability may have the search (or any other task) broken down into smaller web pages, while guaranteeing that the application state for the return web page will be preserved (if even just a copy) in the queue.

At the fifth navigation sequence, the user completes the contact search and returns to the e-mail in-box. The application state for the fifth navigation sequence is illustrated as state 415 and includes the state B for just the in-box web page. This application state B may have been obtained from the original of the application state stored as part of application state 412 since that application state is still stored in the queue. However, had the original of the application state B for the in-box web page been dropped from the queue (as might occur if the queue had been smaller or more sequential web pages were needed to complete the task due to limited display capability), the copy of the application state B stored as part of the application state 414 for the fourth navigation sequence may be used to properly and consistently return the browser to the application state B. The queue 425 includes the state for the first through fifth navigation sequences.

At the sixth navigation sequence, the user opens an e-mail message web page from the e-mail in-box web page. In this case, the application designer does not perceive it as being important that the browser return to the e-mail in-box with the same state. Accordingly, the application state 416 for the sixth navigation sequence includes only the application state E for the e-mail message web page. The queue 426 includes application state for the second through sixth navigation sequences. Since the queue only stores the application state for five navigation sequences, the application state for the first navigation sequence is dropped from the queue.

At the seventh navigation sequence, the user requests to reply to the open e-mail message and is navigated to a first reply web page. Upon constructing the reply, the browser is to return to the open e-mail message web page. Accordingly, the application state 417 for the seventh navigation sequence includes not just the application state F for the first reply construction web page, but also includes or refers to a copy of the application state E for the open e-mail message return web page. The queue 427 includes the application state of the third through seventh navigation sequences.

At the eighth navigation sequence, the user navigates to a second reply construction web page. The application state 418 includes the application state G for the second reply construction as well as the state information E for the open e-mail message return web page. The queue 428 includes the application state of the fourth through eighth navigation sequences.

At the ninth navigation sequence, the user completes the reply construction and cancels the reply. The browser is navigated back to the open e-mail message web page using either the original application state E for the web page present as part of application state 416 in the queue, or alternatively using the copy of the application state E from the application state 418. The queue 429 includes the application state of the fifth through ninth navigation sequences.

The above-described forward navigation would be possible even for a queue that only holds application state for the one most recently navigated web page. However, a larger queue size enables the additional flexibility of backward navigation even in the context of the rich forward navigation process described above. In particular, using the application state in the queue, the user can press the back key four times before reaching a web page that no longer has application state stored in the queue. The application state that was stored in the queue during the forward navigation may be used to provide proper context for responding to a link selected from that same web page encountered during backward navigation.

The principles of the present invention may enable any number of tiers of return web pages. In a two-tier return navigation, a first-tier return web page is return to after completing a task that requires navigation through a set of one or more first-tier task-oriented web pages. Any of the first-tier task-oriented web pages may serve as a second-tier return web page that is to be returned to after a set of one or more second-tier task-oriented web pages has been navigated through. This process may recursively repeat for any number of tiers.

Figure 5:
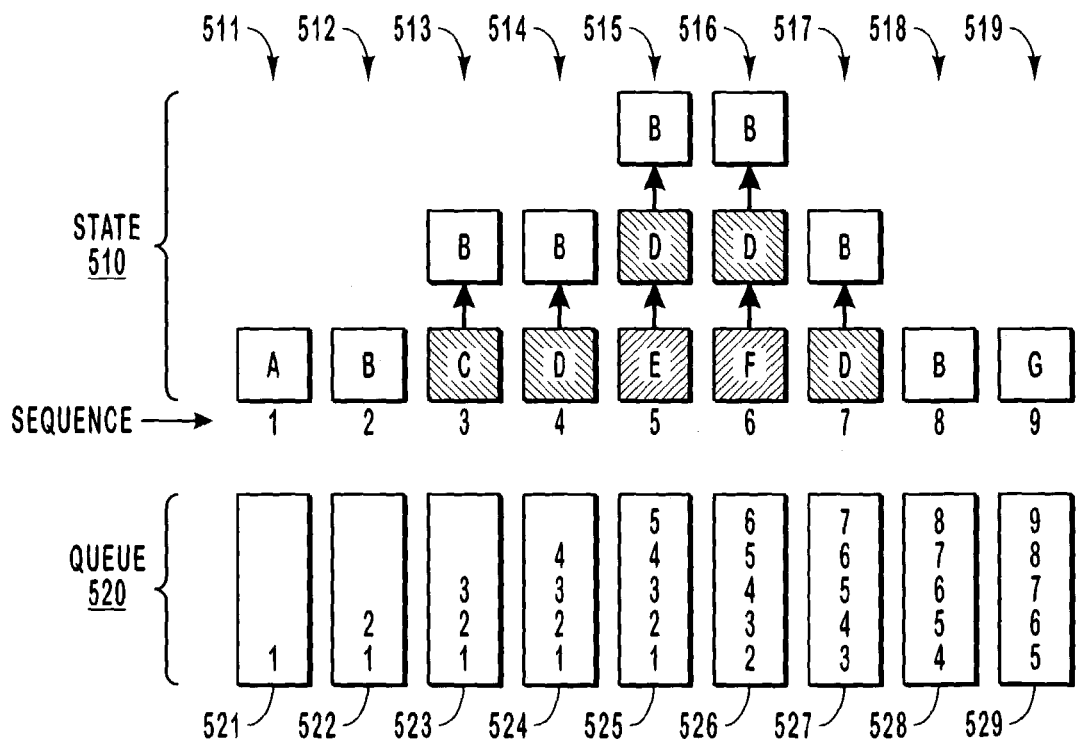
FIG. 5 illustrates a second scenario in which the principles of the present invention are employed to implement two-tiers of task return navigation.

FIG. 5 illustrates a scenario involving two-tiers of return navigation. In particular, the user navigates to a home page web page, opens an in-box web page, searches for a contact, and then from the results of the search composes an e-mail message to the found contact. Upon completing the e-mail composition, the result of the contact search is returned to. After closing the search result web page, the e-mail in-box web page is returned to. In this case, the in-box web page and the final contact search web page may be considered return web pages for the corresponding tasks that are invoked from those web pages. FIG. 5 also illustrates nine navigation sequences with the state 510 being referred to by respective sequence-specific application states 511 through 519 and with the queue 520 being referred to by respective sequence-specific queues 521 through 529.

At the first navigation sequence, the browser navigates to a main menu. The application state for this navigation sequence is illustrated in FIG. 5 as state 511 and as A. The queue 521 includes only the state information for the first navigation sequence.

At the second navigation sequence, the user selects an in-box option and is navigated to an in-box web page. The application state for this navigation sequence is illustrated in FIG. 5 as state 512 and as B. The queue 522 includes the state for both the first and second navigation sequences.

At the third navigation sequence, the user elects to perform a contact search. The application state 513 includes the application state C for the first contact search web page. Furthermore, since the browser is to return to the in-box web page upon completion of the contact search, the application state 513 also includes or refers to a copy of the application state B of the in-box web page. The queue 523 includes the application state for the first through third navigation sequences.

At the fourth navigation sequence, the user navigates to the second (and in this case the final) contact search web page. The application state 514 includes the application state D for the final contact search web page, as well as including or referring to a copy of the application state B for the in-box return web page. The queue 524 includes the application state of the first through fourth navigation sequences.

At the fifth navigation sequence, the user elects to compose an e-mail to the contact displayed in the final contact search web page. Accordingly, the application state 515 includes application state E for the first e-mail construction web page. Furthermore, since the final contact search web page is to be returned to upon completion of the e-mail construction, the application state 515 also includes or refers to a copy of the application state D for the final contact search return web page, which includes or refers to a copy of the application state B for the in-box return web page. The queue 525 includes the application state of the first through fifth navigation sequences.

At the sixth navigation sequence, the user navigates to the second (and in this case final) e-mail construction web page. The application state 516 includes application state F for the final e-mail construction web page. Furthermore, since the final contact search web page is to be returned to upon completion of the e-mail construction, the application state 516 also includes or refers to a copy of the application state D for the final contact search return web page, which includes or refers to a copy of the application state B for the in-box return web page. The queue 526 includes the application state of the second through sixth navigation sequences.

At the seventh navigation sequence, the user closes the e-mail construction web page (e.g., sends the constructed e-mail or cancels the construction), and the browser is accordingly returned to the final contact search return web page. Accordingly, the application state 517 is the same as described above for the application state 514. The original of the application state D may have been recovered from the queue, or the copy of the application state may have been acquired from the application state 516. The complete application state 517 may also be obtained by simply removing the last tier F of the two-tiered application state construction of application state 516. The queue 527 includes application state from the third through seventh navigation sequences.

At the eighth navigation sequence, the user closes the final contact search web page and is thus returned to the in-box return web page. In this case, there is no option to acquire the original of the application state B for the in-box return web page since the original has been lost from the queue. However, the copy of the application state B of the in-box return web page is used from the application state 517. The queue 528 includes application state from the fourth through eighth navigation sequences.

At the ninth navigation sequence, the user navigates to a second web page of the in-box. The application state 519 includes just the application state G for the second in-box web page. The queue 529 includes application state for the fifth through ninth navigation sequences. Once again, the queue allows for up to four backward navigations while preserving state.

Accordingly, the principles of the present invention allow for complex forward navigation in which return to certain important web pages is guaranteed even if the application state queue is limited. Even if many web pages are navigated in order to complete a particular task, the web page is still returned to when the task is complete. Even multiple-tiers of such task return are enabled. Furthermore, backward navigation is enabled even in this complex forward navigation environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A method for a host computing system to maintain an application state such that certain web pages may be returned to once a task is complete even if the original application state for that web page has been discarded before the task is complete due to recycling rules, the method comprising:

maintaining a plurality of queues, each queue including application state information for a specific browsing computing system;

instantiating a queue in a first memory portion, the first memory portion being subject to recycling rules that require an application state be stored for only a limited number of web pages that a browsing computing system had most recently navigated to;

maintaining a second memory portion, the second memory portion not subject to the recycling rules;

receiving a first request from the browser to perform a task that involves sequential navigation to a number of web pages;

creating a first web page using a first application state, the first application state being specific to both the first web page and to the browsing computing system;

after receiving the first request and after creating the first web page using a first application state, placing the first application state in a queue in the first memory portion;

receiving a second request from the browser to navigate from the first web page to a second web page;

placing a copy of the first application state in the second memory portion that is not subject to the recycling rules such that at the time the copy is made, there are two copies of the first application state, one copy of the first application state being in the first memory portion and one copy of the first application state being in the second memory portion;

creating the second web page using second application state;

determining that the browser should return to the first web page when the task is complete;

in response to determining that the browser should return to the first web page, including the copy of the first application state in the second application state;

placing the second application state in the first memory portion that is subject to the recycling rules;

determining that the task is complete; and when the task is complete, using the copy of the first application state, stored in the second memory portion, to create the first web page.

2. A method in accordance with claim 1, wherein the second web page is navigated to directly from the first web page.

3. A method in accordance with claim 1, wherein the second web page is navigated to indirectly from the first web page via the one or more intermediary web pages.

4. A method in accordance with claim 3, further comprising the following:

an act of receiving a third request to navigate to one of the one or more intermediary web pages, the third request being received after the first request and before the second request;

an act of creating the intermediary web page using third application state that is specific to the third web page and the browser;

an act of placing the third application state in the first memory portion, the third application state including or referring to a copy of the first application state;

after having received the second request, an act of receiving an indication that the user of the browser has selected a link in the intermediary web page; and an act of responding to the indication using the third application state placed in the first memory portion.

5. A method in accordance with claim 1, wherein the task is a first task and the one or more intermediary web pages is a first set of one of more intermediary web pages, the method further comprising the following:

an act of receiving a third request from the browser to perform a second task in which the browser is to navigate either directly from the second web page to a third web page, or indirectly from the second first web page via one or more intermediary web pages to the third web page;

an act of placing a copy of the second application state in the second memory portion that is not subject to the recycling rules;

an act of creating the third web page using third application state that is specific to the third web page and the browser;

an act of determining that the browser should return to the second web page when the second task is complete;

in response to the act of determining that the browser should return to the second web page when the second task is complete, an act of including or referring to a copy of the second application state in the third application state;

an act of placing the third application state in the first memory portion that is subject to the recycling rules;

an act of determining that the second task is complete; and an act of using the copy of the second application state, rather than the original of the second application state, to create the second web page upon completion of the second task.

6. A method in accordance with claim 1, wherein the first task is to complete a form that cannot be presented by the browser in a single view.

7. A method in accordance with claim 6, wherein the form is an e-mail construction form.

8. A method in accordance with claim 1, wherein the second task is to perform an address lookup.

9. A computer program product comprising one or more computer-readable media having thereon computer-executable instructions that, when executed by one or more processors at a host computing system, cause the host computing system to perform the method recited in claim 1.

10. A computer program product in accordance with claim 9, wherein the computer-executable instructions, when executed by the one or more processors, further cause the host computing system to perform the following:

an act of receiving a third request to navigate to one of the one or more intermediary web pages, the third request being received after the first request and before the second request;

an act of creating the intermediary web page using third application state that is specific to the third web page and the browser;

an act of placing the third application state in the first memory portion, the third application state including or referring to a copy of the first application state;

after having received the second request, an act of receiving an indication that the user of the browser has selected a link in the intermediary web page; and an act of responding to the indication using the third application state placed in the first memory portion.

11. A computer program product in accordance with claim 9, wherein the task is a first task and the one or more intermediary web pages is a first set of one of more intermediary web pages, wherein the computer-executable instructions, when executed by the one or more processors, further cause the host computing system to perform the following:

an act of receiving a third request from the browser to perform a second task in which the browser is to navigate either directly from the second web page to a third web page, or indirectly from the second first web page via one or more intermediary web pages to the third web page;

an act of placing a copy of the second application state in the second memory portion that is not subject to the recycling rules;

an act of creating the third web page using third application state that is specific to the third web page and the browser;

an act of determining that the browser should return to the second web page when the second task is complete;

in response to the act of determining that the browser should return to the second web page when the second task is complete, an act of including or referring to a copy of the second application state in the third application state;

an act of placing the third application state in the first memory portion that is subject to the recycling rules;

an act of determining that the second task is complete; and an act of using the copy of the second application state, rather than the original of the second application state, to create the second web page upon completion of the second task.

12. A computer program product in accordance with claim 9, wherein the one or more computer-readable media comprises physical memory media.

13. A computer program product in accordance with claim 12, wherein the physical memory media are persistence memory media.

14. A computer program product in accordance with claim 12, wherein the physical memory media are volatile memory media.

* * * * *